United States Patent

Naka et al.

[11] Patent Number: 6,107,984
[45] Date of Patent: Aug. 22, 2000

[54] PROCESSOR OF VIDEO SIGNAL AND DISPLAY UNIT USING THE SAME

[75] Inventors: Kazutaka Naka; Hiroyuki Urata; Atsushi Maruyama; Kiyoshi Yamamoto, all of Yokohama; Akira Hibara, Chigasaki, all of Japan

[73] Assignee: Hitachi, Ltd., Tokyo, Japan

[21] Appl. No.: 08/805,730

[22] Filed: Feb. 25, 1997

[30] Foreign Application Priority Data

Mar. 8, 1996 [JP] Japan .................................... 8-051318

[51] Int. Cl.⁷ .................................. G09G 3/36; G09G 5/00
[52] U.S. Cl. .................................................. 345/99; 345/1
[58] Field of Search .............................. 345/1, 213, 132, 345/327, 99, 98, 100

[56] References Cited

U.S. PATENT DOCUMENTS

| | | | |
|---|---|---|---|
| 4,012,592 | 3/1977 | Ricard | 345/213 |
| 4,475,124 | 10/1984 | Ankeny et al. | 345/213 |
| 5,014,128 | 5/1991 | Chen | 358/160 |
| 5,185,603 | 2/1993 | Medin | 340/814 |
| 5,579,029 | 11/1996 | Arai et al. | 345/213 |
| 5,736,971 | 4/1998 | Shirai | 345/127 |
| 5,854,615 | 12/1998 | Hush | 345/99 |
| 5,870,073 | 2/1999 | Kitou et al. | 345/132 |

FOREIGN PATENT DOCUMENTS 3-207189  10/1991  Japan .

*Primary Examiner*—Amare Mengistu
*Assistant Examiner*—Mansour M. Said
*Attorney, Agent, or Firm*—Evenson, McKeown, Edwards & Lenahan, P.L.L.C.

[57] ABSTRACT

A video signal processor for outputting a video signal based on an output horizontal synchronizing signal and an output vertical synchronizing signal. The processor includes a circuit inputting a reference horizontal synchronizing signal, a circuit inputting a reference vertical synchronizing signal, a circuit generating an output horizontal synchronizing signal having a frequency different from that of the reference horizontal synchronizing signal, and a circuit generating an output vertical synchronizing signal synchronized in phase with the reference vertical synchronizing signal.

21 Claims, 4 Drawing Sheets

PROCESSOR OF VIDEO SIGNAL AND DISPLAY UNIT USING THE SAME

BACKGROUND OF THE INVENTION

The present invention relates to a processor of a video signal which receives a video signal for display from a computer or the like, performs various processing and displays these processed signals on a display unit.

A video signal for display outputted from an engineering work station, a personal computer or a display terminal of a computer or the like has been heretofore outputted as an analog signal in the unit of dot corresponding to a pixel on a display scope. It is possible to perform various processing such as conversion of a signal format such as a field frequency and an aspect ratio and picture processing such as enlargement and reduction, picture synthesis and geometric conversion by converting the video signal into a digital signal and using a memory or an arithmetic processing circuit. For example, when a four-side multiscreen system in which four units of displays are arranged in two stages longitudinally and two units adjacent to each other horizontally and display is made supposing these displays as one set of display is formed, a quarter signal of the input video signal is enlarged all over the scope, and displayed on a display unit positioned at a corresponding position. With this, a large-sized display system of high brightness and high resolution having a comparatively small installation area such as depth can be constituted.

A basic structure of a signal processing circuit for performing digital signal processing is shown in FIG. 1. An input video signal SI is converted into digital data by means of an Analog to Digital (A/D) converter 101 and written in a memory 102. Such memory write processing is performed by the control of a write control circuit 105 with a synchronizing signal of an input video as a reference. The video data written in the memory 102 are read out by a control signal of a read control circuit 106, and are converted into an analog signal again by means of a Digital to Analog (D/A) converter 103 and outputted. It is possible to perform various picture processing such as enlargement and reduction of the picture size and conversion of the field or frame frequency by controlling an address to a memory or differentiating read/write clock frequency during the process of write in and read out of the memory.

As to synchronization of an output video signal at this time, there are a method of generating the video signal from a clock produced by a crystal oscillator or the like irrespective of an input video signal, and a method of generating the video signal from a synchronizing signal of an input video and so on, which are selected in accordance with the system.

In a multiscreen system for displaying by using a plurality of display units and so on, it is required to display while setting output synchronization phases one to another in order to true up display timings of adjacent video signals. Since a horizontal scanning speed is sufficiently fast in general as compared with afterimage characteristics of human beings, perfect phase synchronization is not required, but it is required to have the vertical frequency of slow scanning speed synchronized. In particular, when vertical frequencies of display in the upper and lower stages are not synchronous with each other, flickers (line crawling between stages) due to discontinuity of vertical scanning are generated in the vicinity of the connecting portion from the upper stage to the lower stage, thus causing noticeable picture quality deterioration.

Further, it is required to have vertical blanking periods coincide with one another and to change over a signal during this period also for displaying a plurality of video outputs while switching them in an instant without discontinuity of videos.

When a single signal is inputted while branching it off in a plurality of signal processing circuits and displayed at the same time, it is sufficient to form a structure for generating synchronization of output video signals from a synchronizing signal of the input video by a PLL or the like. Since synchronization of the output video signals is generated from the same input signal, it is possible to have them synchronize in phase mutually. In this method, however, video signals outputted from a plurality of independent computers or image terminals are not synchronous in phase with one another even in the case of the video signal has the same image format such as a horizontal scanning frequency and a line number. Therefore, it is impossible to set the synchronization on the side of the processor.

In a conventional apparatus, a Generation/Generator Lock: Gen Lock system in which horizontal and vertical synchronizing signals which become the reference are inputted from external synchronizing input terminals 110 and 111 and a video signal is outputted with these signals as the reference is used as a method of solving the above-mentioned problem. Since a video signal synchronous in phase with both the horizontal and vertical synchronizing signals inputted from the outside in this Gen Lock system, it is possible to synchronize a plurality of video signals with one another irrespective of the phase of the input signal.

In a conventional Gen Lock system, however, the output format such as horizontal and vertical scanning frequencies of the output video signal has to coincide with that of the external synchronizing signal inputted as a reference signal. Therefore, when the output format from the signal processing circuit is altered, it has been required to change the format of the reference signal from the outside at the same time.

Further, when it is intended to output a plurality of signals of different formats at the same time with synchronization, reference signal sources with the outputs synchronized become necessary by the number of formats that are being displayed at the same time. Furthermore, it has been also required to switch these signal sources appropriately or to connect them over again.

Further, a method that attention is paid only to the vertical synchronizing signal for a Gen Lock reference signal source from the outside and the vertical synchronizing signal from the video signal processor, and both are compared with respect to phases, and the oscillation frequency of a read clock is controlled by a Phase Locked Loop (PLL) is conceivable. In this method, however, control is made by phase comparison of vertical frequency of 20 to 120 Hz. Therefore, there has been such problems that the response speed of the loop cannot be made fast, and the operation is liable to become unstable because of a leakage current, a disturbance factor and so on of a capacitor of a loop filter.

SUMMARY OF THE INVENTION

It is an object of the present invention to provide a processor of a video signal capable of phase synchronization with only the vertical frequency stabilized for a plurality of signals having different output formats with a single Gen Lock reference signal source.

In order to achieve the above-mentioned object, according to the present invention, a read clock is generated from a horizontal synchronizing signal of a Gen Lock reference signal source by multiplying the horizontal synchronizing signal by N (N represents a natural number), and an output horizontal synchronizing signal is generated from a signal obtained by dividing the frequency of the read clock by a horizontal total dot number D which can be set independently of N. Furthermore, an output vertical synchronizing signal is generated from a signal obtained by dividing the frequency of the horizontal synchronizing signal by a total line number L, a line frequency dividing circuit is reset by means of a reference vertical synchronizing signal from the outside, and a video signal is outputted adapting to this synchronizing signal.

Furthermore, a line number P of the Gen Lock reference signal source is set equal to the product of two natural numbers j and k, the horizontal total dot number D is set to a multiple of j, and the total line number L is set to a multiple of k. Otherwise, the total line number L or the total dot number D is set to a multiple of the line number P of the Gen Lock reference signal source.

With such a structure, as to a vertical scanning frequency fvo of the output video signal, an expression (1) is obtainable assuming that a reference horizontal frequency of the Gen Lock signal source is frh and a reference vertical frequency thereof is frv.

$$fvo=(frh \times N)/(D \times L) \quad (1)$$

Here, when the multiplying number N is set like an expression (2), the relationship of an expression (3) is obtainable.

$$N=(D \times L)/P \quad (2)$$

$$fvo=frh/P=frv \quad (3)$$

Since (D×L) is set to be always divisible by P in the expression (2), N always shows a natural number. From the relationship shown in the expression (3), the vertical scanning frequency fvo of the output video signal becomes equal to the reference vertical frequency frv.

Furthermore, it is possible to synchronize with the reference vertical synchronizing signal of the Gen Lock signal source by the structure that the line frequency dividing circuit is reset by the reference vertical synchronizing signal.

Further, since the read clock is generated by multiplying the horizontal synchronizing signal of 10 KHz to 100 KHz of the Gen Lock reference signal source by N, it is possible to generate a stable clock without lowering the speed of response as compared with a system of generating a read clock from the vertical synchronizing signal by a PLL. With this, it is not required to alter the format of the Gen Lock reference signal even when the output format from the signal processor is altered. Further, phase synchronization of the vertical scanning frequency of all of the output video signals also becomes possible with a single Gen Lock reference signal source when a plurality of signals having different output formats are outputted at the same time.

DETAILED DESCRIPTION OF THE PREFERRED EMBODIMENTS

Embodiments of the present invention will be described hereinafter with reference to the drawings.

Figure 1:
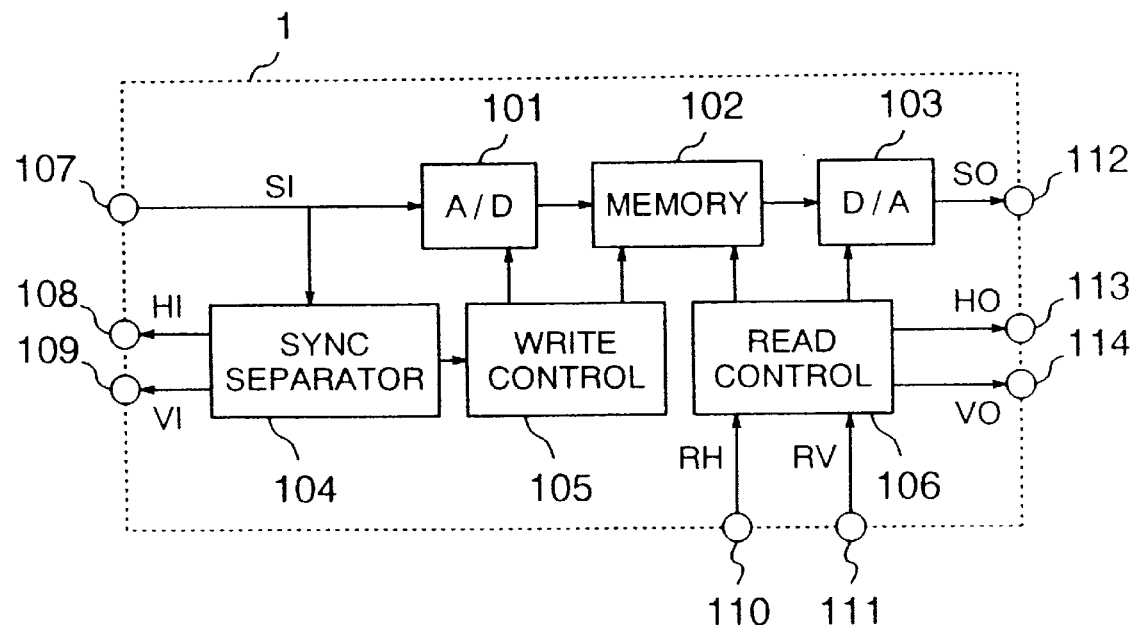
FIG. 1 is a block diagram showing a structure of an embodiment of the present invention.

FIG. 1 shows a structural example of a processor of a video signal to which the present invention is applied.

In FIG. 1, a reference numeral 107 represents an input terminal of a video signal SI from an engineering work station, a personal computer or the like, 108 an input terminal of a composite synchronizing signal H1 including a horizontal synchronizing signal of SI or horizontal and vertical synchronizing information, 109 an input terminal of a vertical synchronizing signal of SI, 101 an A/D conversion circuit for converting the video signal input SI into digital data, 102 a memory in which a video signal converted into digital data is written, 103 a D/A conversion circuit for converting image data read out of the memory into an output video signal S0, 112 an output terminal of the video signal S0, 104 a sync separator circuit for separating a synchronizing signal included in the input video signal SI or shaping waveforms of synchronizing signals from the terminals 108 and 109, 105 a write control circuit for generating a write clock or a write control signal into the memory based on the synchronizing information from the sync separator circuit 104, 110 an input terminal of a horizontal reference synchronizing signal RH, 111 an input terminal of a vertical reference synchronizing signal RV, 106 a read control circuit for generating a read control signal to the memory and a read dot clock to the D/A conversion circuit 103, 113 an output terminal of a horizontal synchronizing signal HO of the output video signal S0, 114 an output terminal of a vertical synchronizing signal VO of the output video signal S0, and 1 a processor of a video signal to which the present invention is applied.

A video signal inputted from the terminal 107 is converted into digital data in the A/D conversion circuit 101 and written in the memory 102. A sampling clock used in the A/D conversion circuit 101 at this time is generated from a horizontal synchronizing signal from the sync separator circuit 104 by a Phase Lock Loop (PLL) in the write control circuit 105. Data are read out of the memory 102 by the control of the read control circuit 106, converted into analog data in the D/A conversion circuit 103 and outputted from an output terminal 112.

It is possible to perform various picture processing such as enlargement and reduction of a picture size, conversion of a field or frame frequency by respective control circuits controlling the address to the memory or differentiating read and write clock frequencies during the process of write to and read out of these memories. Output terminals 112, 113 and 114 are connected directly to the display or to the display through an edit controller such as a switcher, and display a video signal processed by a signal processing circuit. In the read control circuit 106 for reading data out of the memory 102, processing is performed based on a reference synchronizing signal inputted from the outside through the terminals 110 and 111.

Next, an internal structure of the read control circuit 106 will be described with reference to FIG. 2.

106 represents a read control circuit shown in a block diagram in FIG. 1, 110 an input terminal of a reference horizontal synchronizing signal RH from the outside, 111 an input terminal of a reference vertical synchronizing signal RV from the outside, 2 a phase frequency comparison circuit for comparing the reference horizontal synchronizing signal RH with the output of a frequency dividing circuit 7, 3 a voltage controlled oscillator (VCO) which is controlled by the phase frequency comparison circuit 2 and generates a read clock, 4 a frequency dividing circuit for dividing the frequency of the read clock into 1/D and generating an output horizontal synchronizing signal HO, 5 a frequency dividing circuit for dividing the frequency of the output horizontal synchronizing signal HO and generating an output vertical synchronizing signal VO, 6 a memory control circuit for generating a control signal adapted to the memory from the read clock from VCO3, the output horizontal synchronizing signal HO and the output vertical synchronizing signal VO, 7 a frequency dividing circuit for dividing the frequency of the read clock from VCO3 into 1/N, 113 an output terminal of the output horizontal synchronizing signal HO, and 114 an output terminal of the output vertical synchronizing signal VO.

A PLL is constituted of the phase frequency comparison circuit 2, VCO3 and the frequency dividing circuit 7. By means of this PLL, a frequency N times as high as the reference horizontal synchronizing signal RH inputted from the terminal 110 is outputted from VCO3 as a read clock. The output horizontal synchronizing signal HO is generated by dividing the frequency of this read dot clock by a horizontal total dot number D including the blanking period in the frequency dividing circuit 4, and further the output vertical synchronizing signal VO is generated by dividing the frequency of the output horizontal synchronizing signal HO by the total line number L in the frequency dividing circuit 5. The reference vertical synchronizing signal RV inputted from the terminal 111 is inputted to the frequency dividing circuit 5 and resets a counter within the frequency dividing circuit. With this, operation is performed so that the phase of the output vertical synchronizing signal always becomes equal to the reference vertical synchronizing signal RV.

The frequency division ratios of these frequency dividing circuits and the oscillation frequency range of VCO3 and so on can be set by an external control circuit not illustrated, and can be made variable depending on specifications of an input signal, contents of signal processing and so forth. As an example, a case that the present invention is applied to a scan converter which writes only the effective portion of an input video signal in the memory 102 and converts the vertical frequency will be shown hereunder.

Respective set values in the case that a video signal having effective pixels, 1,280 horizontally and 1,024 vertically that have been written into the memory 102 is made to synchronize with a Gen Lock signal source of the reference vertical frequency frv=80 Hz, the reference horizontal frequency frh=42 KHz and a scanning line number P=525 so as to output a video signal are shown. When it is assumed that the horizontal total dot D=1,680 and the total line number L=1,070 including blanking, the frequency division ratio N of the frequency dividing circuit 7 is determined by substituting these numbers for the expression (2), as follows.

$$N=(D \times L)/P=(1,680 \times 1,070)/525=3,424 \tag{4}$$

The frequency of the read clock becomes 143.8 MHz which is 3,424 times as high as the reference horizontal frequency frh=42 KHz.

The output horizontal scanning frequency becomes fho=143.8 MHz/1,680=85.6 KHz and output vertical scanning frequency becomes fvo=85.6 KHz/1,070=80 Hz, thus showing frv=fvo.

With this, the vertical frequencies become identical, and synchronization of phases can be realized by resetting the frequency dividing circuit 5 with the reference vertical synchronizing signal RV.

At this time, the horizontal total dot D and the total line number L including blanking are not limited thereto, but it is sufficient that D×L is a value divisible by the line number P of the Gen Lock signal source and satisfies a blanking quantity required for expressing on a display. Since a concrete setting method can be expressed, when the scanning line number P=525 is expressed in a form of a product of two numerals, as 525=1×525=3×175=5×105=7×75=15×35=21×25, it is sufficient to select 5×105 for instance from these combinations, and to select those D and L that satisfy the blanking quantity required for expression on a display from a multiple of 105 (1,680=105×16) and a multiple of 5 (1,070=5×214), respectively.

As the other setting examples, respective set values in the case that a video signal having effective pixels, 1,024 horizontally and 768 vertically, is made to synchronize with a Gen Lock signal source of the reference vertical frequency frv=80 Hz, the reference horizontal frequency frh=42 KHz and the scanning line number P=525 so as to output a video signal are shown. When it is assumed that the vertical total dot D=1,260 and the total line number L=800 including blanking, the frequency division ratio N of the frequency dividing circuit 7 is determined by substituting these numbers for the expression (2), as follows.

$$N=(D \times L)/P=(1,260 \times 800)/525=1,920 \tag{5}$$

The frequency of the read clock becomes 80.64 MHz which is 1,920 times as high as the reference horizontal frequency frh=42 KHz.

The output horizontal scanning frequency becomes fho=80.64 MHz/1,260=64.0 KHz and the output vertical scanning frequency becomes fvo=64.0 KHz/800=80 Hz, thus showing frv=fvo. With this, vertical frequencies become identical, and further, synchronization of phases can be realized by resetting the frequency dividing circuit 5 by the reference vertical synchronizing signal RV.

Similarly to the previous example, it is sufficient to select 21×25 for instance from the combinations of the scanning line number P=525=1×525=3×175=5×105=7×75=15×35=21×25, and to select those D and L that satisfy the blanking quantity required for expressing on a display from a multiple of 21 (1,260=21×60) and a multiple of 25 (800=25×32), respectively.

It is also possible to synchronize the output vertical frequency by means of a single Gen Lock reference signal source by realizing a signal processing circuit with such a structure and setting as described above when a video signal of different format such as 1,280×1,024 or 1,024×768 is outputted, and it is not required to change the signal configuration of the Gen Lock reference signal source.

Further, since the vertical scanning frequency is convertible into a fixed frequency irrespective of the input signal configuration, it is possible to reduce surface flicker of a display signal by setting the reference vertical frequency of the Gen Lock reference signal source to approximately 80 Hz to 120 Hz.

Furthermore, since the read clock is generated from the horizontal synchronizing signal of the Gen Lock reference signal source by multiplying the frequency thereof by N, it is possible to generate a stable clock without lowering the speed of response as compared with a system of generating a read clock from a vertical synchronizing signal by a PLL.

Besides, a case that the present invention is applied to a scan converter for writing only the effective portion of an input video signal in the memory 102 so as to convert the vertical frequency has been shown here as an example. However, the present invention can be adapted generally to processors that sample video signals and perform digital signal processing using the memory, and meets the gist of the invention irrespective of the processing contents.

Figure 2:
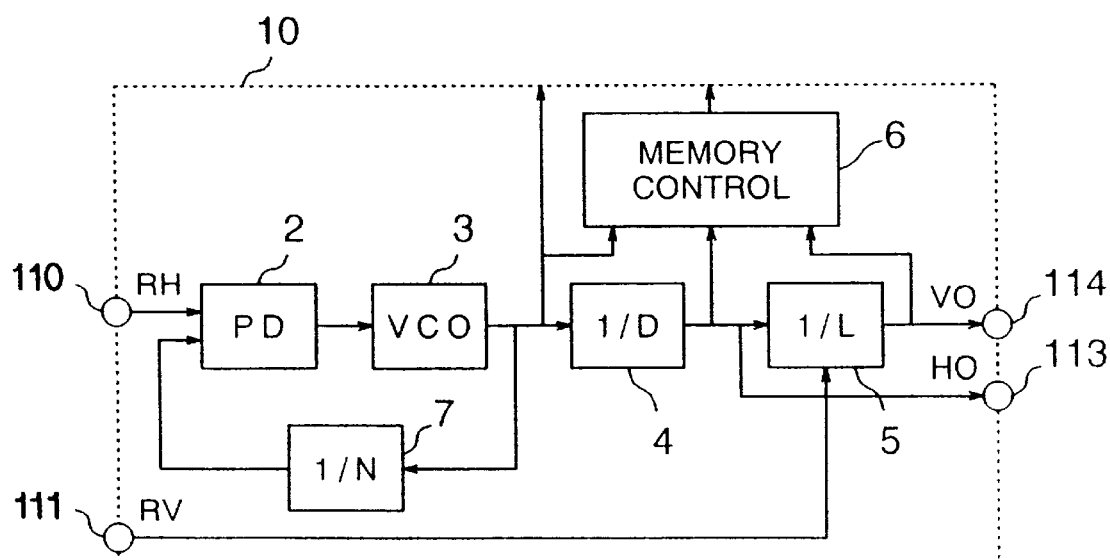
FIG. 2 is a block diagram showing a structure of the read control circuit 106 shown in FIG. 1.

Furthermore, although horizontal and vertical synchronizing signals from the Gen Lock reference signal source show configurations to be inputted independently in the embodiments shown in FIG. 1 and FIG. 2, these signals are not limited thereto, but may be a composite synchronizing signal in which horizontal and vertical synchronizing signals are compounded. Otherwise, those signals may be those that the burst signal which becomes a reference of a frequency such as a black burst signal is multiplexed. Or, a configuration in which control data are multiplexed during an original video signal period may also be adopted.

Further, when there are a plurality of video signal apparatus, it is possible to use the reference synchronizing signals of a single Gen Lock reference signal source with distribution, and to synchronize the output vertical synchronizing frequencies of the plurality of video signal apparatus. A structural example thereof will be described with reference to FIG. 3.

Figure 3:
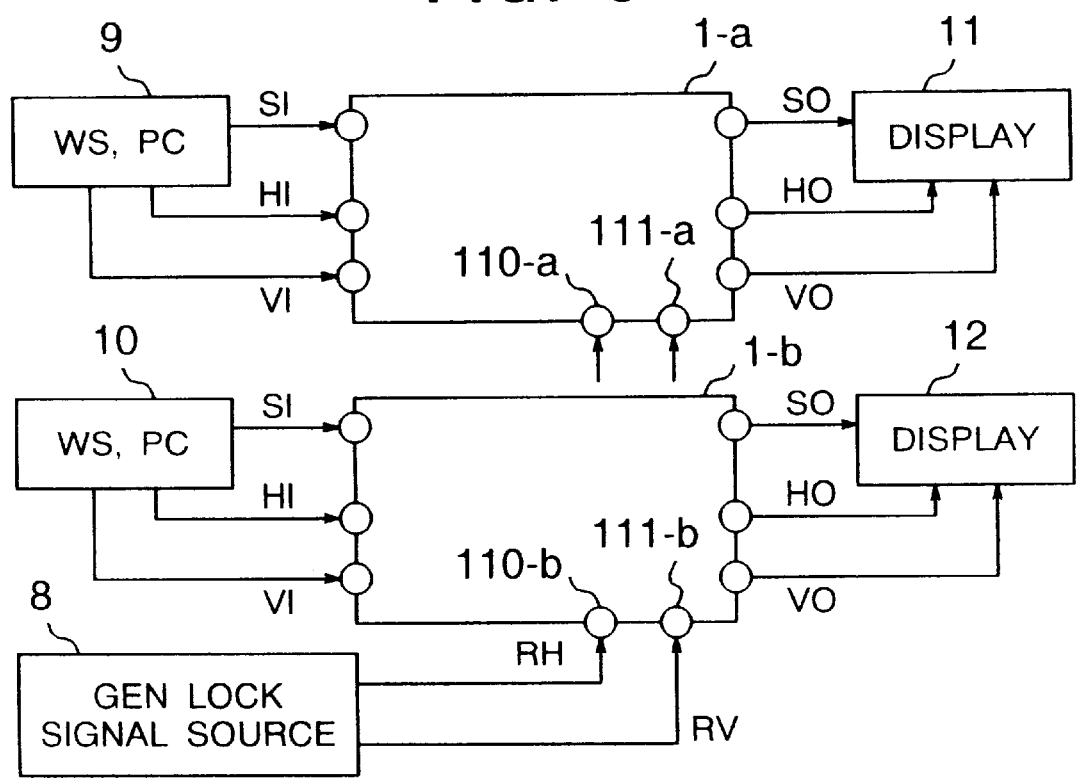
FIG. 3 is a block diagram showing a structure when a plural sets of signal processors of the present invention are used.

In FIG. 3, 1-$a$ and 1-$b$ represent signal processors of the present invention, and the inside frequency dividing circuits and so on are set conforming to the configuration of the input video signal or contents of signal processing, respectively. 8 represents a Gen Lock reference signal source that gives the same reference synchronizing signal to two signal processors 1-$a$ and 1-$b$, and 9 and 10 represent display video signal sources such as an engineering work station and a personal computer, and it is assumed that both have different image formats (9 has effective pixels of 1,280×1,024 and 10 has effective pixels of 1,024×768). 11 and 12 represent displays for expressing video signals from the signal processors 1-$a$ and 1-$b$, and are displays of what is called multiscan type in which horizontal and vertical frequencies are able to follow up within a specific range.

Similarly to the case shown in FIG. 2, when a Gen Lock signal source of the reference vertical frequency frv=80 Hz, the reference horizontal frequency frh=42 KHz and the scanning line number P=525 is used, and the signal processor 1-$a$ processes a video signal having effective pixels of 1,280×1,024, it is possible to set the output horizontal scanning frequency fho=85.6 KHz and the output vertical scanning frequency fvo=80 Hz and to synchronize the output vertical synchronizing signal with the reference vertical synchronizing signal by setting the setting inside the signal processor 1-$a$ to show the output total dot D=1,680, the output total line number L=1,070 and the frequency division ratio of the frequency dividing circuit 7 N=3,442.

When the same Gen Lock signal source is used, and the signal processor 1-$b$ processes a video signal having effective pixels of 1,024×768, it is possible to set the output horizontal scanning frequency fho=64.0 KHz and the output vertical scanning frequency fvo=80 Hz, and to synchronize the output vertical synchronizing signal with the reference vertical synchronizing signal by setting the setting inside the signal processor 1-$b$ to show the output total dot D=1,260, the output total line number L=800, and the frequency division ratio of the frequency dividing circuit 7 N=1,920.

As described above, it is possible to synchronize the output vertical synchronizing frequencies of a plurality of signals having different formats using a single Gen Lock reference signal source. In the example shown here, the outputs of two signal processors are synchronized with each other, but the processors are not limited to two and the same is applied when the processors are increased to three or four. Thus, since one set of Gen Lock reference signal source is sufficient regardless of the increase in the number of signal processors, economical effects by simplification of the signal processing system are heightened.

Figure 4:
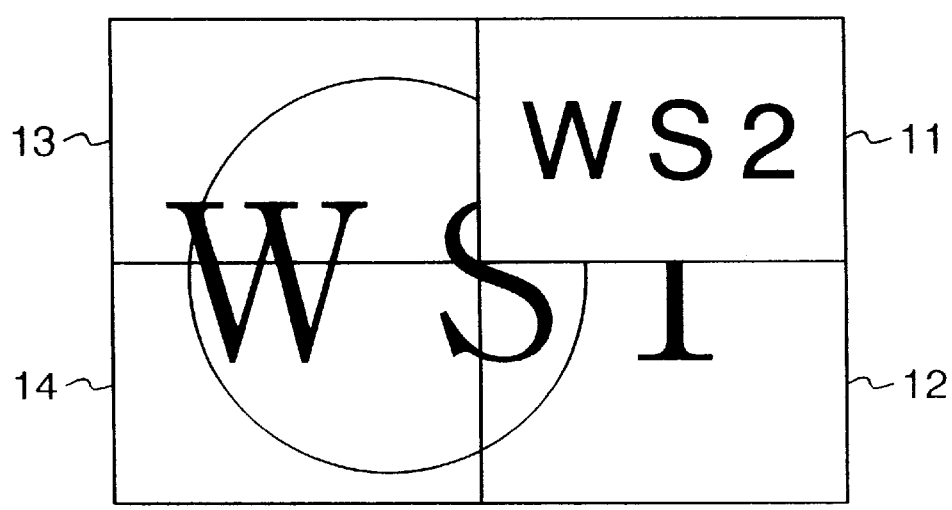
FIG. 4 is an explanatory diagram when a signal processor of the present invention is applied to a multiscreen.

A structure when a four-side multiscreen system is constituted using four sets of signal processors of the present invention is shown in FIG. 4.

In FIG. 4, 11, 12, 13 and 14 represent displays of what is called a multiscan type connected to respective independent signal processors in which horizontal and vertical scanning frequencies can follow up in a specific range. The displays 12, 13 and 14 process and display a signal of the same work station (effective pixels: 1,280×1,024), and a signal of the other work station (effective pixels: 1,024×768) is processed and displayed on the display 11. The displays 12, 13 and 14 display by cutting out a quarter region of 640×512 among effective pixels of 1,280×1,024, and the display 11 displays all of the effective pixels of 1,024×768.

In a conventional multiscreen system, the display vertical frequencies have been synchronized since the displays 12, 13 and 14 process the same input signal and display it. However, it has been difficult to synchronize the display vertical frequency of the display 11 outputted from an independent video signal source and having a different signal format with the displays 12, 13 and 14. As a result, since the displays 11 and 12 are displayed by an independent scanning system that is different both in frequency and phase, a flicker (line crawling between stages) is generated because of discontinuity of vertical scanning at the boundary between the displays 11 and 12, thus causing noticeable picture quality deterioration.

Since continuous vertical scanning is performed also at the boundary between the displays 11 and 12 by using a video signal processor according to the present invention is used for expression on these displays 11, 12, 13 and 14 and synchronizing the vertical display frequencies, an effect of preventing picture quality deterioration is produced.

The embodiment shown here has been formed so that the displays 12, 13 and 14 display the same input signal with enlargement, and the display 11 indicates all of the effective pixels. However, the embodiment is not limited thereto, but may be one that processes signals of different signal configurations from different signal sources and displays on all of the four sides, and it is possible to display high picture quality by synchronization of the vertical frequency in a single Gen Lock reference signal source for various display representation.

Further, the number of display sides of the multiscreen system is not limited to four sides, but vertical frequency synchronization by a single Gen Lock reference signal source is possible and high picture quality and varicolored display performance becomes possible even when the number of signal processors is increased in accordance with the number of sides such as 6 sides, 9 sides and 36 sides.

Furthermore, by setting the reference vertical frequency of the Gen Lock reference signal source to approximately 80 Hz to 120 Hz, it is possible to decrease the surface flicker which causes picture quality deterioration with a multiscreen system having a large area and high brightness.

Further, since it is possible to convert signals having an equal display effective pixel number into a completely same signal configuration even if the signal is a video signal from a different video signal source, an effect of shortening adjusting time of display is also produced. When a concrete example is cited, it is supposed that there are two sets of work stations WS1 and WS2, WS1 having effective pixels of 1,280×1,024, the horizontal scanning frequency of 64 KHz and the vertical scanning frequency of 60 Hz and WS2 having effective pixels of 1,280×1,024, the horizontal scanning frequency of 78 KHz and the vertical frequency of 72 Hz. When both are changed over to each other and displayed on a display unit, it is required to adjust the display independently because horizontal and vertical scanning frequencies of two signals are different from each other. By converting the vertical scanning frequency into a fixed frequency using a signal processor of the present invention, two signals of WS1 and WS2 are converted into signals having the same specifications of the horizontal scanning frequency of 85.6 KHz and the vertical scanning frequency of 80 Hz. Thus, it is not required to adjust the display independently conforming to two signals, respectively, but adjustment one time for displaying a signal of the horizontal scanning frequency of 85.6 KHz and the vertical scanning frequency of 80 Hz is sufficient, thus producing economical effects due to shortening of adjustment time.

In the embodiment shown in FIG. 1, a video signal in one system has been processed, but a structural example when a color signal of three systems of RGB is processed will be described with reference to the block diagram shown in FIG. 5.

Figure 5:
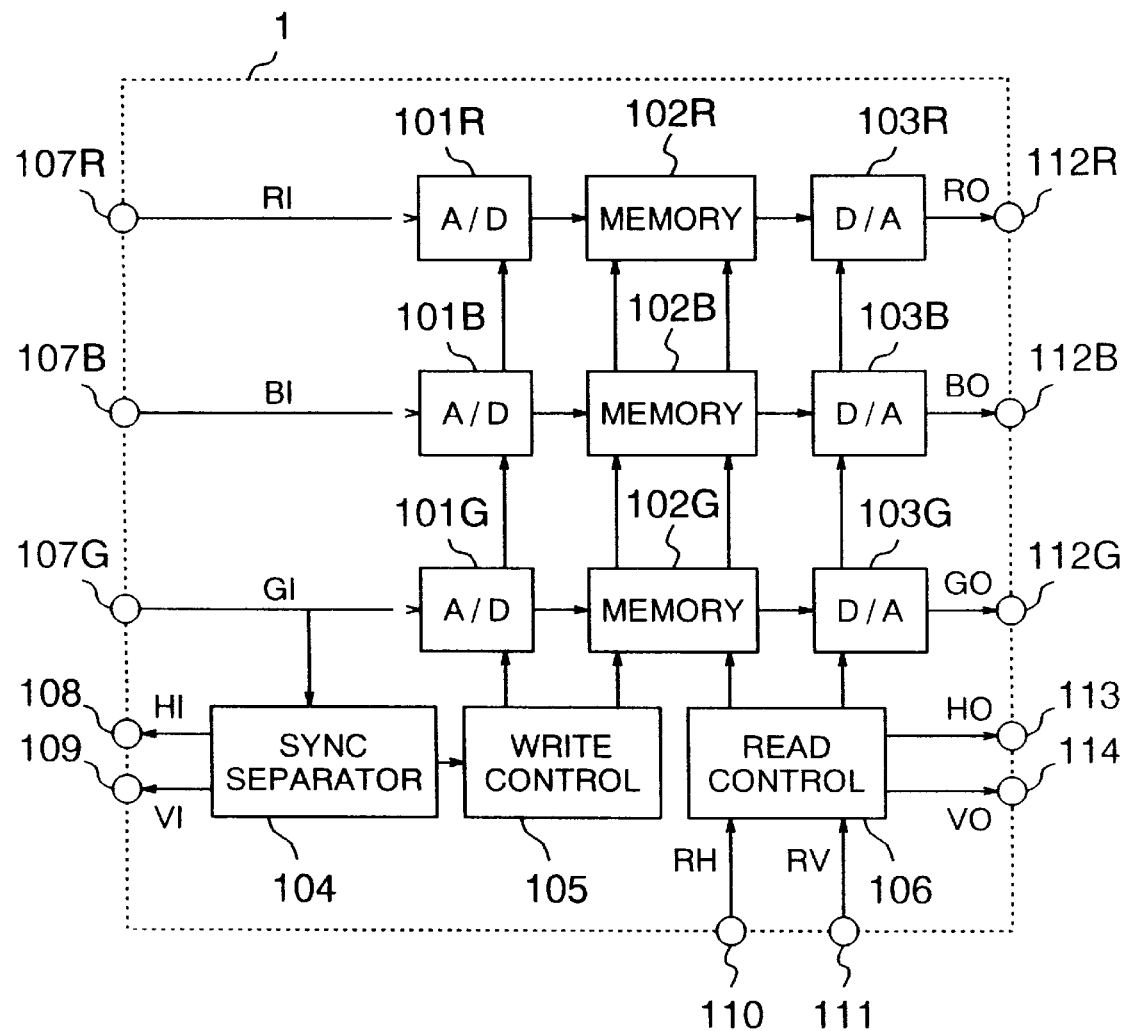
FIG. 5 is a block diagram showing a structure of another embodiment of the present invention.

In the structure shown in FIG. 5, the video signal input terminal 107, the A/D conversion circuit 101, the memory 102, the D/A conversion circuit 103 and the video signal output terminal 112 are made to correspond to three systems of RGB, respectively. Namely, 107R represents an input terminal of an R input signal R1, 107B an input terminal of a B input signal B1, 107G an input terminal of a G input signal G1, 101R an A/D conversion circuit of an R signal, 101B an A/D conversion circuit of a B signal, 101G an A/D conversion circuit of a G signal, 102R a memory for storing data of the R signal, 102B a memory for storing data of the B signal, 102G a memory for storing data of the G signal, 103R a D/A conversion circuit of the R signal, 103B a D/A conversion circuit of the B signal, 103G a D/A conversion circuit of the G signal, 112R an output terminal of an output R signal RO, 112B an output terminal of an output B signal BO and 112G an output terminal of an output G signal GO. The A/D conversion circuits 101R, 101B and 101G, memories 102R, 102B and 102G and D/A conversion circuits 103R, 103B and 103G are controlled by a write control circuit 105 and a read control circuit 106 that are common to RGB. A G input signal G1 from the terminal 107G is inputted to a sync separator circuit 104 in order to correspond to a synchronizing signal multiplexed to the G signal in addition to synchronizing inputs H1 and V1 independent of the video signal. The other structure is similar to the structure shown in FIG. 1. With the structure as described above, it is also possible to process a color video signal consisting of signals of three systems of RGB similarly to the embodiment described so far.

In the embodiment shown so far, a signal processor of the present invention has a structure independent of the display. A structural example in which a signal processor of the present invention is incorporated into a display will be described hereinafter with reference to FIG. 6.

Figure 6:
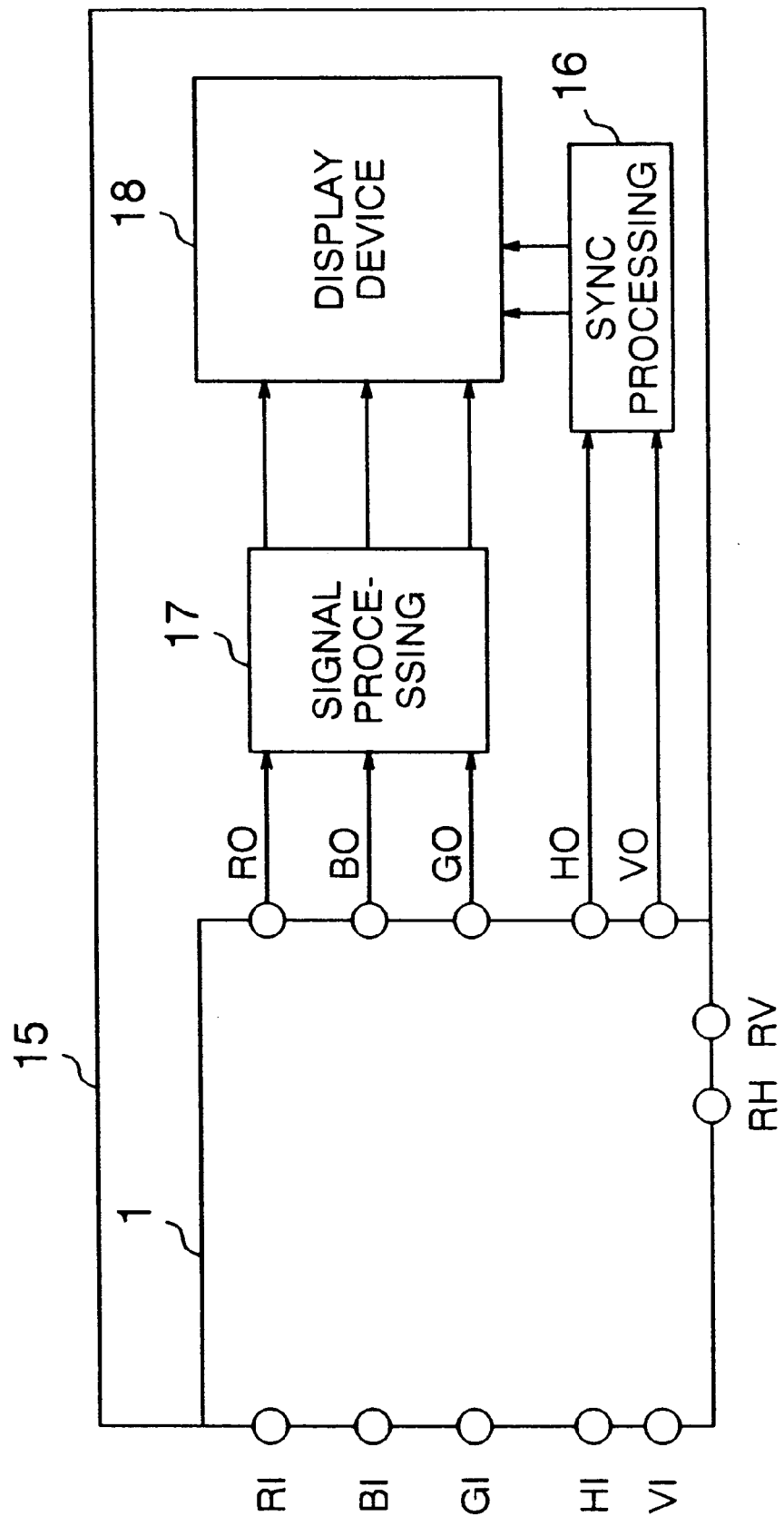
FIG. 6 is a block diagram showing a structure of a display unit in which a signal processor of the present invention is used.

In FIG. 6, 1 represents a signal processor of the present invention, 15 a display in which a signal processor of the present invention is incorporated, 18 a display device such as a CRT, a liquid crystal and a plasma display, 17 a signal processor for performing conversion processing into a signal required for the display device 18, and 16 a synchronizing processor for performing horizontal and vertical scanning.

The video signals RO, BO and GO processed in the signal processor 1 according to the present invention are converted into voltage or current required for having the display device 18 operate in the signal processor 17. Further, the horizontal synchronizing signal HO and the vertical synchronizing signal VO from the signal processor 1 are inputted to the synchronizing processor 16, and perform processing for scanning the display device 18 horizontally and vertically. To be concrete, generation of a sawtooth wave, driving of a deflecting coil and so on for horizontal and vertical scanning are performed in a CRT, and driver processing is performed for determining X-Y coordinates in a liquid crystal and a plasma display.

With such a structure as described above, an independent power source and a cabinet become unnecessary by containing the signal processor in the display, thus producing economical effects. In particular, since processing is performed one to one for the display in the signal processor of the present invention, it is possible to control the increase of the number of connection lines by containing the signal processor in the display, thus realizing a display unit performing a high function.

The present invention can also be executed in other configurations than the above-mentioned embodiment without deviating from the spirit or principal features. Therefore, the above-mentioned embodiment is only a simple illustration of the present invention in all respects, and shall not be interpreted limitatively. The scope of the present invention is specified by claims. Modifications and alterations belonging to an equivalent scope of these claims all fall within the scope of the present invention.

What is claimed is:

1. A video signal processor for outputting a video signal based on reference synchronizing signals which are independent of an input video signal including an input horizontal synchronizing signal and an input vertical synchronizing signal, comprising:

means for inputting a reference horizontal synchronizing signal;

means for inputting a reference vertical synchronizing signal;

means for generating an output horizontal synchronizing signal having a frequency different from that of said reference horizontal synchronizing signal;

means for generating an output vertical synchronizing signal which is synchronized in phase with said reference vertical synchronizing signal regardless of a value of said input vertical synchronizing signal; and means for outputting a video signal based on said output horizontal and vertical synchronizing signals.

2. A video signal processor according to claim 1, wherein the means for generating an output horizontal synchronizing signal having a frequency different from that of a reference horizontal synchronizing signal and the means for generating an output vertical synchronizing signal synchronized in phase with a reference vertical synchronizing signal include:

means for generating an output dot clock from the reference horizontal synchronizing signal;

means for generating an output horizontal synchronizing signal based on a signal obtained from said output dot clock by dividing the frequency thereof by a frequency division ratio D where D is a natural number; and means for generating an output vertical synchronizing signal based on a signal obtained from said output horizontal synchronizing signal by dividing the frequency thereof by a frequency division ratio L where L is a natural number;

wherein the product (D·L) of the frequency division ratio D and the frequency division ratio L becomes a multiple of a line number P (where P is a natural number) of a reference signal source for generating the reference horizontal synchronizing signal and the reference vertical synchronizing signal.

3. A video signal processor according to claim 1, wherein the means for generating an output horizontal synchronizing signal having a frequency different from that of a reference horizontal synchronizing signal and the means for generating an output vertical synchronizing signal synchronized in phase with a reference vertical synchronizing signal include:

means for generating an output dot clock from the reference horizontal synchronizing signal;

means for generating an output horizontal synchronizing signal based on a signal obtained from said output dot clock by dividing the frequency thereof by a frequency division ratio D where D is a natural number; and means for generating an output vertical synchronizing signal based on a signal obtained from said output horizontal synchronizing signal by dividing the frequency thereof by a frequency division ratio L where L is a natural number;

wherein a line number P (where P is a natural number) of a reference signal source for generating the reference horizontal synchronizing signal and the reference vertical synchronizing signal is equal to the product (j·k) of two natural numbers j and k, the frequency division ratio D is a multiple of j and the frequency division ratio L is a multiple of k.

4. A video signal processor according to claim 1, wherein the means for generating an output vertical synchronizing signal synchronized in phase with a reference vertical synchronizing signal includes:

means for counting output horizontal synchronizing signals; and means for initializing said count value in synchronization with the reference vertical synchronizing signal.

5. A video signal display apparatus for displaying a video signal based on reference synchronizing signals which are independent from an input video signal including an input horizontal synchronizing signal and an input vertical synchronizing signal, means for inputting a reference vertical synchronizing signal;

means for inputting a reference horizontal synchronizing signal;

means for scanning a display device horizontally with a frequency different from said reference horizontal synchronizing signal; and means for scanning the display device vertically in synchronization in phase with said reference vertical synchronizing signal regardless of a value of said input vertical synchronizing signal.

6. A video signal display apparatus according to claim 5, wherein the means for scanning a display device horizontally with a frequency different from that of a reference horizontal synchronizing signal and the means for scanning the display device vertically in synchronization in phase with a reference vertical synchronizing signal include:

means for generating an output dot clock from the reference horizontal synchronizing signal;

means for generating an output horizontal synchronizing signal based on a signal obtained from said output dot clock by dividing the frequency thereof by a frequency division ratio D where D is a natural number; and means for generating an output vertical synchronizing signal based on a signal obtained from said output horizontal synchronizing signal by dividing the frequency thereof by a frequency division ratio L where L is a natural number;

wherein the product (D·L) of the frequency division ratio D and the frequency division ratio L becomes a multiple of a line number P (where P is a natural number) of a reference signal source for generating the reference horizontal synchronizing signal and the reference vertical synchronizing signal.

7. A video signal display apparatus according to claim 5, wherein the means for scanning a display device vertically in synchronization in phase with said reference vertical synchronizing signal includes:

means for counting output horizontal synchronizing signals; and means for initializing said count value in synchronization with the reference vertical synchronizing signal.

8. A video signal display apparatus for displaying a video signal, comprising:

means for inputting a reference vertical synchronizing signal;

means for inputting a reference horizontal synchronizing signal;

means for scanning a display device horizontally with a frequency different from said reference horizontal synchronizing signal; and means for scanning the display device vertically in synchronization in phase with said reference vertical synchronizing signal, wherein the means for scanning a display device horizontally with a frequency different from that of a reference horizontal synchronizing signal and the means for scanning the display device vertically in synchronizing signal include:

means for generating an output dot clock from the reference horizontal synchronizing signal;

means for generating an output horizontal synchronizing signal based on a signal obtained from said output dot clock by dividing the frequency thereof by a frequency division ratio D where D is a natural number; and means for generating an output vertical synchronizing signal based on a signal obtained from said output horizontal synchronizing signal by dividing the frequency thereof by a frequency division ratio L where L is a natural number;

wherein a line number P (where P is a natural number) of a reference signal source for generating the reference horizontal synchronizing signal and the reference vertical synchronizing signal is equal to the product (j·k) of two natural numbers j and k, the frequency division ratio D is a multiple of j and the frequency division ratio L is a multiple of k.

9. A video signal display apparatus in which a plurality of unit display devices are arranged one-dimensionally or two-dimensionally adjacent to one another, said video signal display apparatus displaying a video signal based on reference synchronizing signals which are independent from an input video signal including an input horizontal synchronizing signal and an input vertical synchronizing signal comprising:

means for generating a reference vertical synchronizing signal;

means for generating a reference horizontal synchronizing signal; and means for scanning all the unit display devices vertically in synchronization in phase with said reference vertical synchronizing signal regardless of a value of said input vertical synchronizing signal.

10. A video signal display apparatus according to claim 9, wherein the means for scanning vertically unit display device vertically in synchronization in phase with the reference vertical synchronizing signal of said synchronizing signal includes:

means for generating an output dot clock from the reference horizontal synchronizing signal;

means for generating an output horizontal synchronizing signal based on a signal obtained from said output dot clock by dividing the frequency thereof by a frequency division ratio D where D is a natural number; and means for generating an output vertical synchronizing signal based on a signal obtained from said output horizontal synchronizing signal by dividing the frequency thereof by a frequency division ratio L where L is a natural number;

wherein the product (D·L) of the frequency division ratio D and the frequency division ratio L becomes a multiple of a line number P (where P is a natural number) of a reference signal source for generating the reference horizontal synchronizing signal and the reference vertical synchronizing signal.

11. A video signal display apparatus according to claim 9, further comprising means for scanning a display device horizontally with a frequency different from that of said reference horizontal synchronizing signal in respective unit display devices.

12. A video signal display apparatus according to claim 9, further comprising means for scanning a display device horizontally with frequencies different from that of said reference horizontal synchronizing signal and with two or more different frequencies in respective unit display devices.

13. A video signal display apparatus according to claim 9, wherein the means for scanning all the unit display devices vertically in synchronization in phase with said reference vertical synchronizing signal is provided in each unit display device independently.

14. A video signal display apparatus in which a plurality of unit display devices are arranged one-dimensionally or two-dimensionally adjacent to one another, comprising:

means for generating a reference vertical synchronizing signal;

means for generating a reference horizontal synchronizing signal; and means for scanning all the unit display devices vertically in synchronization in phase with said reference vertical synchronizing signal, wherein the means for scanning vertically a unit display device vertically in synchronization in phase with the reference vertical synchronizing signal of said synchronizing signal includes:

means for generating an output dot clock from the reference horizontal synchronizing signal;

means for generating an output horizontal synchronizing signal based on a signal obtained from said output dot clock by dividing the frequency thereof by a frequency division ratio D where D is a natural number; and means for generating an output vertical synchronizing signal based on a signal obtained from said output horizontal synchronizing signal by dividing the frequency thereof by a frequency division ratio L where L is a natural number;

wherein a line number P (where P is a natural number) of a reference signal source for generating the reference horizontal synchronizing signal and the reference vertical synchronizing signal is equal to the product (j·k) of two natural numbers j and k, the frequency division ratio D is a multiple of j and the frequency division ratio L is a multiple of k.

15. A video signal processor for taking a video signal into a memory based on an input horizontal synchronizing signal and an input vertical synchronizing signal and outputting a video signal from the memory based on an output horizontal synchronizing signal and an output vertical synchronizing signal, comprising:

a circuit inputting an input horizontal synchronizing signal;

a circuit inputting an input vertical synchronizing signal;

a circuit inputting a reference horizontal synchronizing signal;

a circuit inputting a reference vertical synchronizing signal;

a circuit generating an output horizontal synchronizing signal having a frequency different from that of said reference horizontal synchronizing signal;

a circuit generating an output vertical synchronizing signal synchronized in phase with said reference vertical synchronizing signal regardless of a value of said input vertical synchronizing signal; and a circuit outputting a video signal from the memory based on said output horizontal synchronizing signal and output vertical synchronizing signal.

16. A video signal processor according to claim 15, wherein the circuit generating an output horizontal synchronizing signal having a frequency different from that of a reference horizontal synchronizing signal and the circuit generating an output vertical synchronizing signal synchronized in phase with a reference vertical synchronizing signal include:

a circuit generating an output dot clock from the reference horizontal synchronizing signal;

a circuit generating an output horizontal synchronizing signal based on a signal obtained from said output dot clock by dividing the frequency thereof by a frequency division ratio D where D is a natural number; and a circuit generating an output vertical synchronizing signal based on a signal obtained from said output horizontal synchronizing signal by dividing the frequency thereof by a frequency division ratio L where L is a natural number;

wherein the product (D·L) of the frequency division ratio D and the frequency division ratio L is a multiple of a line number P (where P is a natural number) of a reference signal source for generating the reference horizontal synchronizing signal and the reference vertical synchronizing signal.

17. A video signal processor for taking a video signal into a memory based on an input horizontal synchronizing signal and an input vertical synchronizing signal and outputting a video signal from the memory based on an output horizontal synchronizing signal and an output vertical synchronizing signal, comprising:

a circuit inputting a reference horizontal synchronizing signal;

a circuit inputting a reference vertical synchronizing signal;

a circuit generating an output horizontal synchronizing signal having a frequency different from that of said reference horizontal synchronizing signal;

a circuit generating an output vertical synchronizing signal synchronized in phase with said reference vertical synchronizing signal; and a circuit outputting a video signal from the memory based on said output horizontal synchronizing signal and output vertical synchronizing signal, wherein the circuit generating an output horizontal synchronizing signal having a frequency different from that of a reference horizontal synchronizing signal and the circuit generating an output vertical synchronizing signal synchronized in phase with a reference vertical synchronizing signal include:

a circuit generating an output dot clock from the reference horizontal synchronizing signal;

a circuit generating an output horizontal synchronizing signal based on a signal obtained from said output dot clock by dividing the frequency thereof by a frequency division ratio D (where D is a natural number); and a circuit generating an output vertical synchronizing signal based on a signal obtained from said output horizontal synchronizing signal by dividing the frequency thereof by a frequency division ratio L where L is a natural number;

wherein a line number P (wherein P is a natural number) of a reference signal source for generating the reference horizontal synchronizing signal and the reference vertical synchronizing signal is equal to the product (j·k) of two natural numbers j and k, the frequency division ratio D is a multiple of j and the frequency division ratio L is a multiple of k.

18. A video signal processor for outputting a video signal based on an output horizontal synchronizing signal and an output vertical synchronizing signal, comprising:

means for inputting a reference horizontal synchronizing signal;

means for inputting a reference vertical synchronizing signal;

means for generating an output horizontal synchronizing signal having a frequency non-integral multiple times different from that of said reference horizontal synchronizing signal;

means for generating an output vertical synchronizing signal which is synchronized in phase with said reference vertical synchronizing signal;

wherein the means for generating an output horizontal synchronizing signal having a frequency non-integral multiple times different from that of a reference horizontal synchronizing signal and the means for generating an output vertical synchronizing signal synchronized in phase with a reference vertical synchronizing signal include:

means for generating an output dot clock from the reference horizontal synchronizing signal;

means for generating an output horizontal synchronizing signal based on a signal obtained from said output dot clock by dividing the frequency thereof by a frequency division ratio D where D is a natural number; and means for generating an output vertical synchronizing signal based on a signal obtained from said output horizontal synchronizing signal by dividing the frequency thereof by a frequency division ratio L where L is a natural number;

wherein the product (D·L) of the frequency division ratio D and the frequency division ratio L becomes a multiple of a line number P (where P is a natural number) of a reference signal source for generating the reference horizontal synchronizing signal and the reference vertical synchronizing signal.

19. A video signal processor for outputting a video signal based on an output horizontal synchronizing signal and an output vertical synchronizing signal, comprising:

means for inputting a reference horizontal synchronizing signal;

means for inputting a reference vertical synchronizing signal;

means for generating an output horizontal synchronizing signal having a frequency non-integral multiple times different from that of said reference horizontal synchronizing signal;

means for generating an output vertical synchronizing signal which is synchronized in phase with said reference vertical synchronizing signal, wherein the means for generating an output horizontal synchronizing signal having a frequency non-integral multiple times different from that of a reference horizontal synchronizing signal and the means for generating an output vertical synchronizing signal synchronized in phase with a reference vertical synchronizing signal include:

means for generating an output dot clock from the reference horizontal synchronizing signal;

means for generating an output horizontal synchronizing signal based on a signal obtained from said output dot clock by dividing the frequency thereof by a frequency division ratio D where D is a natural number; and means for generating an output vertical synchronizing signal based on a signal obtained from said output horizontal synchronizing signal by dividing the frequency thereof by a frequency division ratio L where L is a natural number;

wherein a line number P (where P is a natural number) of a reference signal source for generating the reference horizontal synchronizing signal and the reference vertical synchronizing signal is equal to the product (j·k) of two natural numbers j and k, the frequency division ratio D is a multiple of j and the frequency division ratio L is a multiple of k.

20. A video signal display apparatus for displaying a video signal based on an output horizontal synchronizing signal and an output vertical synchronizing signal, comprising:

means for inputting a reference vertical synchronizing signal;

means for inputting a reference horizontal synchronizing signal;

means for scanning a display device horizontally with a frequency non-integral multiple times different from said reference horizontal synchronizing signal; and means for scanning the display device vertically in synchronization in phase with said reference vertical synchronizing signal, wherein the means for scanning a display device horizontally with a frequency non-integral multiple times different from that of a reference horizontal synchronizing signal and the means for scanning the display device vertically in synchronization in phase with a reference vertical synchronizing signal include:

means for generating an output dot clock from the reference horizontal synchronizing signal;

means for generating an output horizontal synchronizing signal based on a signal obtained from said output dot clock by dividing the frequency thereof by a frequency division ratio D where D is a natural number; and means for generating an output vertical synchronizing signal based on a signal obtained from said output horizontal synchronizing signal by dividing the frequency thereof by a frequency division ratio L where L is a natural number;

wherein the product (D·L) of the frequency division ratio D and the frequency division ratio L becomes a multiple of a line number P (where P is a natural number) of a reference signal source for generating the reference horizontal synchronizing signal and the reference vertical synchronizing signal.

21. A video signal display apparatus for displaying a video signal based on an output horizontal synchronizing signal and an output vertical synchronizing signal, comprising:

means for inputting a reference vertical synchronizing signal;

means for inputting a reference horizontal synchronizing signal;

means for scanning a display device horizontally with a frequency non-integral multiple times different from said reference horizontal synchronizing signal; and means for scanning the display device vertically in synchronization in phase with said reference vertical synchronizing signal, wherein the means for scanning a display device horizontally with a frequency non-multiple times different from that of a reference horizontal synchronizing signal and the means for scanning the display device vertically in synchronization in phase with a reference vertical synchronizing signal include:

means for generating an output dot clock from the reference horizontal synchronizing signal;

means for generating an output horizontal synchronizing signal based on a signal obtained from said output dot clock by dividing the frequency thereof by a frequency division ratio D where D is a natural number; and means for generating an output vertical synchronizing signal based on a signal obtained from said output horizontal synchronizing signal by dividing the frequency thereof by a frequency division ratio L where L is a natural number;

wherein a line number P (where P is a natural number) of a reference signal source for generating the reference horizontal synchronizing signal and the reference vertical synchronizing signal is equal to the product (j·k) of two natural numbers j and k, the frequency division ratio d is a multiple of j and the frequency division ratio L is a multiple of k.

* * * * *